US009715300B2

(12) United States Patent
Sinclair et al.

(10) Patent No.: US 9,715,300 B2
(45) Date of Patent: Jul. 25, 2017

(54) TOUCH SCREEN INTERACTION USING DYNAMIC HAPTIC FEEDBACK

(71) Applicant: Microsoft Corporation, Redmond, WA (US)

(72) Inventors: Michael J. Sinclair, Kirkland, WA (US); Michel Pahud, Kirkland, WA (US); Hrvoje Benko, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 13/784,587

(22) Filed: Mar. 4, 2013

(65) Prior Publication Data

US 2014/0247240 A1    Sep. 4, 2014

(51) Int. Cl.
*G06F 3/041* (2006.01)
*G06F 3/0488* (2013.01)
*G06F 3/0481* (2013.01)

(52) U.S. Cl.
CPC .......... *G06F 3/0414* (2013.01); *G06F 3/0488* (2013.01); *G06F 3/04815* (2013.01); *G06F 2203/014* (2013.01); *G06F 2203/04105* (2013.01)

(58) Field of Classification Search
CPC ........ G06F 3/016; G06F 1/1613; G06F 3/041; G06F 3/0414; G05B 19/18
USPC ........ 345/173-174, 156; 178/18.06; 700/156
See application file for complete search history.

(56) References Cited

U.S. PATENT DOCUMENTS

| | | | |
|---|---|---|---|
| 6,008,800 A * | 12/1999 | Pryor | 345/173 |
| 8,279,193 B1 | 10/2012 | Birnbaum et al. | |
| 2002/0033795 A1* | 3/2002 | Shahoian et al. | 345/156 |
| 2002/0044132 A1 | 4/2002 | Fish | |
| 2002/0072814 A1* | 6/2002 | Schuler | G05B 19/108 700/56 |

(Continued)

FOREIGN PATENT DOCUMENTS

| | | |
|---|---|---|
| EP | 2506117 A1 | 10/2012 |
| WO | 2011/091993 A1 | 8/2011 |

OTHER PUBLICATIONS

Mackenzie, Scott, "Input Devices and Interaction Techniques for Advanced Computing", Retrieved at <<http://www.yorku.ca/mack/Barfield.html>> In Book—Virtual Environments and Advanced Interface Design, pp. 25, Retrieved Date: Mar. 7, 2013.

(Continued)

*Primary Examiner* — Jennifer Mehmood
*Assistant Examiner* — James Nokham
(74) *Attorney, Agent, or Firm* — International IP Law Group, PLLC

(57) ABSTRACT

A method, system, and one or more computer-readable storage media for providing multi-dimensional haptic touch screen interaction are provided herein. The method includes detecting a force applied to a touch screen by an object and determining a magnitude, direction, and location of the force. The method also includes determining a haptic force feedback to be applied by the touch screen on the object based on the magnitude, direction, and location of the force applied to the touch screen, and displacing the touch screen in a specified direction such that the haptic force feedback is applied by the touch screen on the object.

18 Claims, 11 Drawing Sheets

(56) References Cited

U.S. PATENT DOCUMENTS

| | | | |
|---|---|---|---|
| 2002/0109708 A1* | 8/2002 | Peurach | G06F 3/016 715/700 |
| 2002/0163497 A1* | 11/2002 | Cunningham et al. | 345/156 |
| 2004/0108995 A1 | 6/2004 | Hoshino et al. | |
| 2006/0119586 A1 | 6/2006 | Grant et al. | |
| 2006/0250377 A1* | 11/2006 | Zadesky | G06F 1/1613 345/173 |
| 2006/0255683 A1 | 11/2006 | Suzuki et al. | |
| 2007/0229478 A1* | 10/2007 | Rosenberg | A63F 13/06 345/173 |
| 2008/0303797 A1* | 12/2008 | Grothe | 345/173 |
| 2010/0027854 A1* | 2/2010 | Chatterjee et al. | 382/124 |
| 2010/0108408 A1* | 5/2010 | Colgate et al. | 178/18.03 |
| 2011/0141052 A1* | 6/2011 | Bernstein | G06F 3/016 345/174 |
| 2012/0105333 A1 | 5/2012 | Maschmeyer et al. | |
| 2012/0105367 A1 | 5/2012 | Son et al. | |
| 2012/0182248 A1 | 7/2012 | Kobayashi et al. | |
| 2012/0229400 A1* | 9/2012 | Birnbaum et al. | 345/173 |
| 2012/0268384 A1* | 10/2012 | Peterson et al. | 345/170 |
| 2012/0271545 A1 | 10/2012 | Cheng | |
| 2013/0327917 A1* | 12/2013 | Steiner et al. | 248/649 |

OTHER PUBLICATIONS

Tsang, et al., "Boom Chameleon: Simultaneous Capture of 3D Viewpoint, Voice and Gesture Annotations on a Spatially-Aware Display", Retrieved at <<http://images.autodesk.com/adsk/files/2002_uist_boomchameleon.pdf>> In Proceedings of the 15th Annual ACM Symposium on User Interface Software and Technology, pp. 10, Oct. 27, 2002.

"Bringing Robots to Entertainment (The Video There Talks of a RoboScreen U.S. Pat. No. 7,545,108)", retrieved at <<http://live.wsj.com/video/bringing-robots-to-entertainment/1DB5718D-D3E3-4C5A-A30D-449183494323.html#!1DB5718D-D3E3-4C5A-A30D-449183494323>> Jul. 6, 2010, pp. 2.

"Robotic Arts", Retrieved at <<http://www.roboticarts.com/>> Retrieved Date: Mar. 13, 2013, pp. 17.

Herot, et al., "One-Point Touch Input of Vector Information from Computer Displays", Retrieved at <<http://web.media.mit.edu/~lip/Papers/Arh_Mach_Refs/PSD.pdf>> : In Journal of ACM SIGGRAPH Computer Graphics, vol. 12, Issue 3, Aug. 1978, p. 7.

Blackshaw, et al., "Recompose—Direct and Gestural Interaction with an Actuated Surface", Retrieved at <<https://docs.google.com/viewer?a=v&q=cache:UpsSG4GLus8J:tmg-trackr.media.mit.edu:8020/SuperContainer/RawData/Papers/450-Recompose%2520Direct%2520and%2520Gestural/Published/PDF+Recompose+%E2%80%93+Direct+and+Gestural+Interaction+with+an+Actuated+Surface&hl=en&gl=in&pid=bl&srcid=ADGEESjlbyL1dGf8HEgdYbNq8DdmqCMYqjUny-AGdv8Z-, CHI 2011, May 7-12, 2011.

Leithinger, et al., "Relief: A Scalable Actuated Shape Display", Retrieved at <<http://www.openobject.org/bits/wp-content/uploads/2011/06/p221-leithinger.pdf>> In Proceedings of the Fourth International Conference on Tangible, Embedded, and Embodied Interaction, Jan. 25, 2010, pp. 2.

Pangaro, et al., "The Actuated Workbench: Computer-Controlled Actuation in Tabletop Tangible Interfaces", Rretrieved at <<http://www.crg.computer-science.nottingham.ac.uk/~gtr/G53CCT/actuatedWorkbench.pdf>> In Proceedings of the 15th Annual ACM Symposium on User Interface Software and Technology, Oct. 27, 2002, pp. 10.

Araujo, et al., "Mockup Builder: Direct 3D Modeling on and Above the Surface in a Continuous Interaction Space", Retrieved at <<http://www2.lifl.fr/~casiez/publications/MockupBuilder-GI2012.pdf>> In Proceedings of 38th Graphics Interface Conference, May 28, 2012, pp. 8.

Alexander, et al., "Tilt Displays: Designing Display Surfaces with Multi-axis Tilting and Actuation", Retrieved at <<http://www.lancs.ac.uk/staff/alexandj/pdf/MHCI12_TiltDisplays.pdf>> In Proceedings of the 14th International Conference on Human-Computer Interaction with Mobile Devices and Services, Sep. 21, 2012, pp. 10.

Minsky, M. (1984). Manipulating Simulated Objects with Real-World Gestures Using a Force and Position Sensitive Screen, Computer Graphics, 18(3), 195-203.

Haipeng Mi and Masanori Sugimoto. 2011. HATs: interact using height-adjustable tangibles in tabletop interfaces. In Proceedings of the ACM International Conference on Interactive Tabletops and Surfaces (ITS '11). ACM, New York, NY, USA, 71-74. http://doi.acm.org/10.1145/2076354.2076368.

"International Search Report & Written Opinion for PCT Patent Application No. PCT/US2014/019764", Mailed Date: May 28, 2014, Filed Date: Mar. 3, 2014, 9 Pages.

* cited by examiner

100

300

600

700

800

TOUCH SCREEN INTERACTION USING DYNAMIC HAPTIC FEEDBACK

BACKGROUND

According to current technology, two-dimensional (e.g., x-axis and y-axis) touch screen interaction is fairly ubiquitous and intuitive. A user's finger may contact a touch screen at a specific position to affect a visual result corresponding to the specific position on the touch screen. In some cases, three-dimensional (3D) touch screen interaction is provided using an on-screen slider, a mouse scroll wheel, a reassigned mouse axis, a joystick, or the like. However, such devices do not provide for intuitive 3D (e.g., z-axis) touch screen interaction or offer any haptic feedback. Moreover, while some degree of haptic sensing may be provided using token spring compliance or object shape built-in technology, haptic technology in general is widely overlooked in current human-computer interaction (HCI) applications.

SUMMARY

The following presents a simplified summary of the subject innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

An embodiment provides a method for providing multi-dimensional haptic touch screen interaction. The method includes detecting a force applied to a touch screen by an object and determining the magnitude, direction, and location of the force applied to the touch screen. The method also includes determining a haptic force feedback to be applied by the touch screen on the object based on the magnitude, direction, and location of the force applied to the touch screen, and displacing the touch screen in a specified direction such that the haptic force feedback is applied by the touch screen on the object.

Another embodiment provides a computing system for providing multi-dimensional haptic touch screen interaction. The computing system includes a haptic touch screen device including a touch screen and a force sensor. The force sensor is configured to detect a force applied to the touch screen by an object. The computing system also includes a processor that is adapted to execute stored instructions and a system memory. The system memory includes code configured to determine the magnitude, direction, and location of the force applied to the touch screen. The system memory also includes code configured to determine a haptic force feedback to be applied by the touch screen on the object based on the magnitude, direction, and location of the force applied to the touch screen. In addition, the haptic touch screen device is configured to move the touch screen such that the haptic force feedback is applied by the touch screen on the object.

In addition, another embodiment provides one or more computer-readable storage media for storing computer-readable instructions. The computer-readable instructions provide a system for providing multi-dimensional haptic touch screen interaction when executed by one or more processing devices. The computer-readable instructions include code configured to detect a force applied to a touch screen by a finger of a user and determine the magnitude, direction, and location of the force applied to the touch screen. The computer-readable instructions also include code configured to determine a haptic force feedback to be applied by the touch screen on the finger of the user based on the magnitude, direction, and location of the force applied to the touch screen, and move the touch screen a in a specified direction such that the haptic force feedback is applied by the touch screen on the finger of the user. The movement of the touch screen is controlled in real-time based on variations in the force applied to the touch screen by the finger of the user.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

As discussed above, current devices do not provide for intuitive three-dimensional (3D) touch screen interaction, especially in the haptic domain. Accordingly, embodiments described herein are directed to providing intuitive multi-dimensional haptic touch screen interaction. Specifically, embodiments described herein provide a computing system including a haptic touch screen that provides for an intuitive multi-dimensional interaction in response to a user "pushing" on the touch screen by applying a force exceeding a threshold to move the touch screen away from the user or "pulling" on the touch screen by applying a force that does not exceed the threshold to move the touch screen toward the user. Additional haptic capabilities may also be provided as linear and non-linear forces to the force feedback signal as a function of touch pressure and z-axis position. Such linear and non-linear forces may be manifested as viscous feel, a discernible detent at certain z-positions, or texture of a function of z-position, for example. Furthermore, although embodiments are described herein with relation to 3D interaction in the z-direction, it is to be understood that embodiments described herein may also be used to provide interaction in any other suitable dimension or plane.

Figure 1:
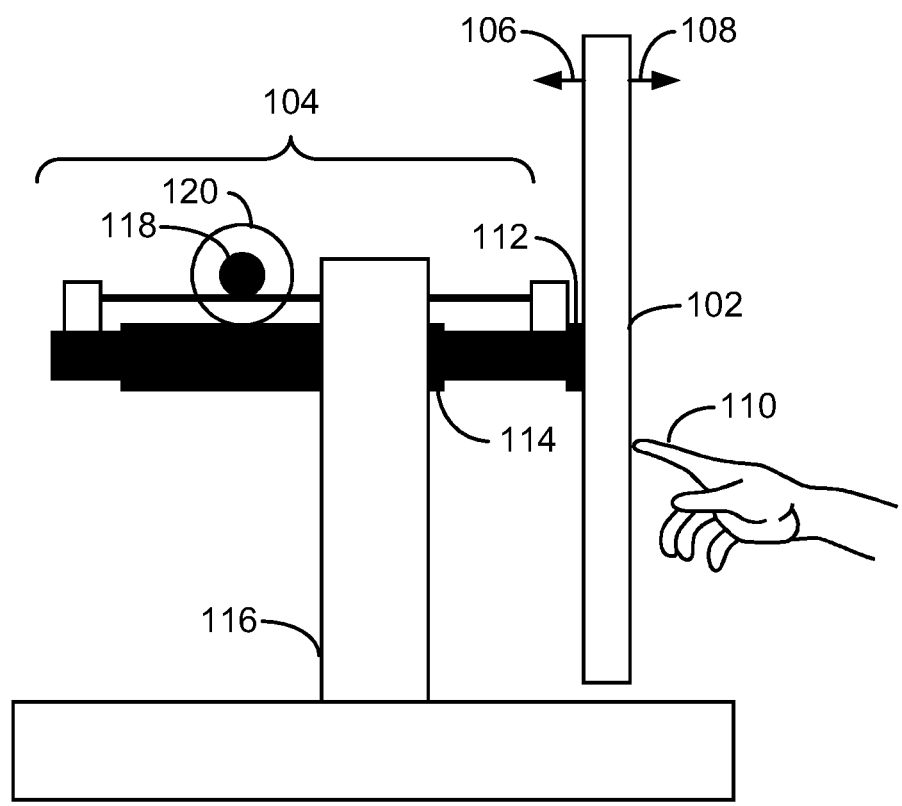
FIG. 1 is a schematic showing a side view of a 3D haptic touch screen device.

As a preliminary matter, some of the figures describe concepts in the context of one or more structural components, variously referred to as functionality, modules, features, elements, or the like. The various components shown in the figures can be implemented in any manner, such as via software, hardware (e.g., discrete logic components), or firmware, or any combinations thereof. In some embodiments, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like.

The term "logic" encompasses any functionality for performing a task. For instance, each operation illustrated in the flowcharts corresponds to logic for performing that operation. An operation can be performed using, for instance, software, hardware, firmware, or the like.

As used herein, the terms "component," "system," "client," "search engine," "browser," "server," and the like are intended to refer to a computer-related entity, either hardware, software (e.g., in execution), or firmware, or any combination thereof. For example, a component can be a process running on a processor, an object, an executable, a program, a function, a library, a subroutine, a computer, or a combination of software and hardware.

By way of illustration, both an application running on a server and the server can be a component. One or more components can reside within a process, and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device or media.

Computer-readable storage media can include but are not limited to magnetic storage devices (e.g., hard disk, floppy disk, and magnetic strips, among others), optical disks (e.g., compact disk (CD) and digital versatile disk (DVD), among others), smart cards, and flash memory devices (e.g., card, stick, and key drive, among others). In contrast, computer-readable media (i.e., not storage media) generally may additionally include communication media such as transmission media for wireless signals and the like.

FIG. 1 is a schematic showing a side view of a 3D haptic touch screen device 100. The 3D haptic touch screen device 100 is implemented within a computing system, as discussed further with respect to FIG. 3. The 3D haptic touch screen device 100 includes a touch screen 102. The touch screen 102 may be a two-dimensional (2D) touch screen, such as a plasma or LCD touchscreen, including multi-touch or pen-and-touch overlay and stereo 3D viewing capabilities. In various embodiments, the stereo 3D viewing capabilities of the touch screen 102 are provided via active 3D technology. However, in other embodiments, the stereo 3D viewing capabilities of the touch screen 102 may be provided via passive 3D technology.

As shown in FIG. 1, the touch screen 102 is mounted on a single axis robot 104 that is able to move the touch screen 102 orthogonal to the x-y plane of the touch screen 102, i.e., in the z-direction. Specifically, the single axis robot 104 may move the touch screen 102 in the positive z-direction, i.e., away from a user of the computing system, as indicated by arrow 106. Alternatively, the single axis robot 104 may move the touch screen 102 in the negative z-direction, i.e., toward the user of the computing system, as indicated by arrow 108. In various embodiments, a touch force is applied normal to the plane of the touch screen 102 via a finger 110 of the user. The 3D haptic touch screen device 100 detects the applied touch force via a linear force sensor 112 that is mounted to the touch screen 102. In various embodiments, the linear force sensor 112 includes a number of force transducers, as discussed further below. The 3D haptic touch screen device 100 may then interact with the user in response to the detection of the applied touch force by moving the touch screen 102 in the positive or negative z-direction, for example.

The single axis robot 104 includes a dual linear bearing 114. The touch screen 102 is mounted to the dual linear bearing 114 along the z-axis. In addition, the dual linear bearing 114 is mounted to a table-top frame 116 that stabilizes the computing device 100 on a flat surface. The single axis robot 104 also includes a servomotor 118 with a mounted encoder 120. In various embodiments, the servomotor 118 is a rotational brushed servomotor with an attached pinion gear that is mounted to the frame of the single axis robot 104. The servomotor 118 may provide for linear actuation of the dual linear bearing 114. Specifically, the servomotor 118 with the attached pinion gear may drive a linear rack gear that is mounted to the touch screen 102, as discussed further with respect to FIG. 3.

Figure 2:
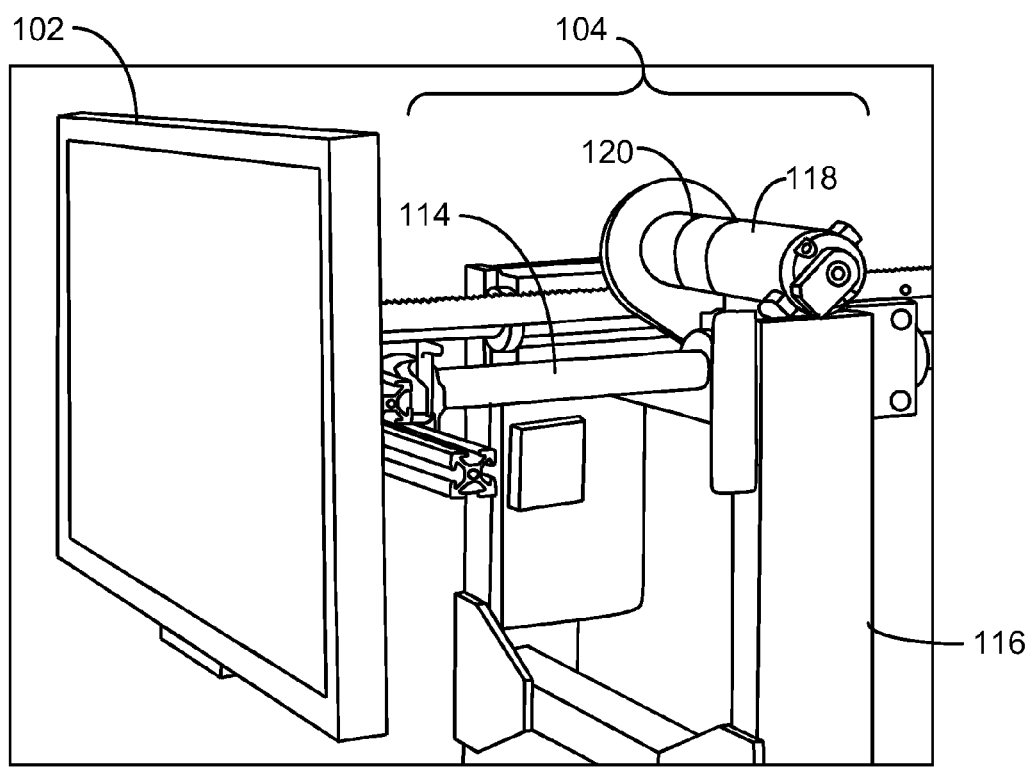
FIG. 2 is a schematic showing a detailed side view of the 3D haptic touch screen device of FIG. 1.

FIG. 2 is a schematic showing a detailed side view of the 3D haptic touch screen device 100 of FIG. 1. Specifically, the schematic of FIG. 2 shows the internal components and wiring of the single axis robot 104.

The schematics of FIGS. 1 and 2 are not intended to indicate that the 3D haptic touch screen device 100 of FIG. 1 is to include all of the components shown in FIGS. 1 and 2. Moreover, the 3D haptic touch screen device 100 may include any number of additional components not shown in FIGS. 1 and 2, depending on the details of the specific implementation. Furthermore, while FIGS. 1 and 2 are described with respect to a 3D haptic touch screen device 100, embodiments described herein are not limited to a 3D haptic touch screen device but, rather, may include any suitable type of multi-dimensional haptic touch screen device. For example, embodiments described herein may include any suitable type of device including an actuated touch screen. More specifically, embodiments described herein may include any type of device that is capable of moving a touch screen in one or more directions and is capable of providing haptic feedback based on the magnitude, direction, and location of a force applied to the touch screen, as well as the position and/or orientation of the touch screen itself.

Figure 3:
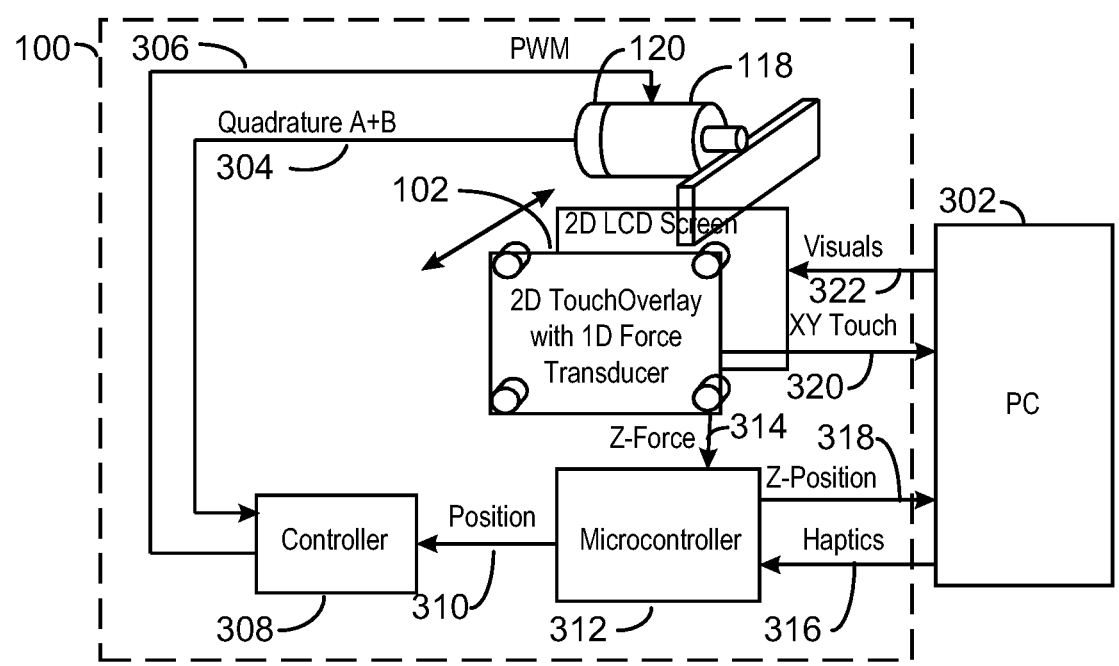
FIG. 3 is a block diagram of a computing system including the 3D haptic touch screen device of FIG. 1.

FIG. 3 is a block diagram of a computing system 300 including the 3D haptic touch screen device 100 of FIG. 1. Like numbered items are as described with respect to FIG. 1. The computing system 300 includes a personal computer (PC) 302, or any other suitable type of computing device that may provide multi-dimensional haptic touch screen interaction. The PC 302 is communicably coupled to the 3D haptic touch screen device 100.

As shown in FIG. 3, the rotational encoder 120 may output an incremental quadrature encoder signal 304 that is proportional to the z-position of the touch screen 102. The servomotor 118 may be driven by a pulse-width-modulation (PWM) signal 306 that is the output of a controller 308 of the servomotor 118. The controller 308 may receive an input signal 310 from a microcontroller 312. The microcontroller 312, in turn, may receive a first input signal 314 indicating the position of the encoder 120, the touch force applied to the touch screen 102, and the z-home and limit switches, as well as a second input signal 316 from the PC 302. The microcontroller 312 may also send a signal 318 indicating the z-position of the touch screen 102 to the PC 302.

The PC 302 may be communicably coupled to the touch screen 102 via a USB connection, for example. The touch screen 102 may send a signal 320 indicating the x-y touch conditions of the touch screen 102, such as the magnitude, direction, and location of the touch force applied by the finger 110 of the user, to the PC 302. Further, the PC 302 may send a stereo video signal 322 to the touch screen 102. The touch screen 102 may then display the stereo video to the user. In some embodiments, if the touch screen 102 uses active 3D technology, the stereo video may be observed by the user through shutter glasses. In other embodiments, if the touch screen 102 uses passive 3D technology, the stereo video may be observed by the user through polarized glasses.

Figure 4:
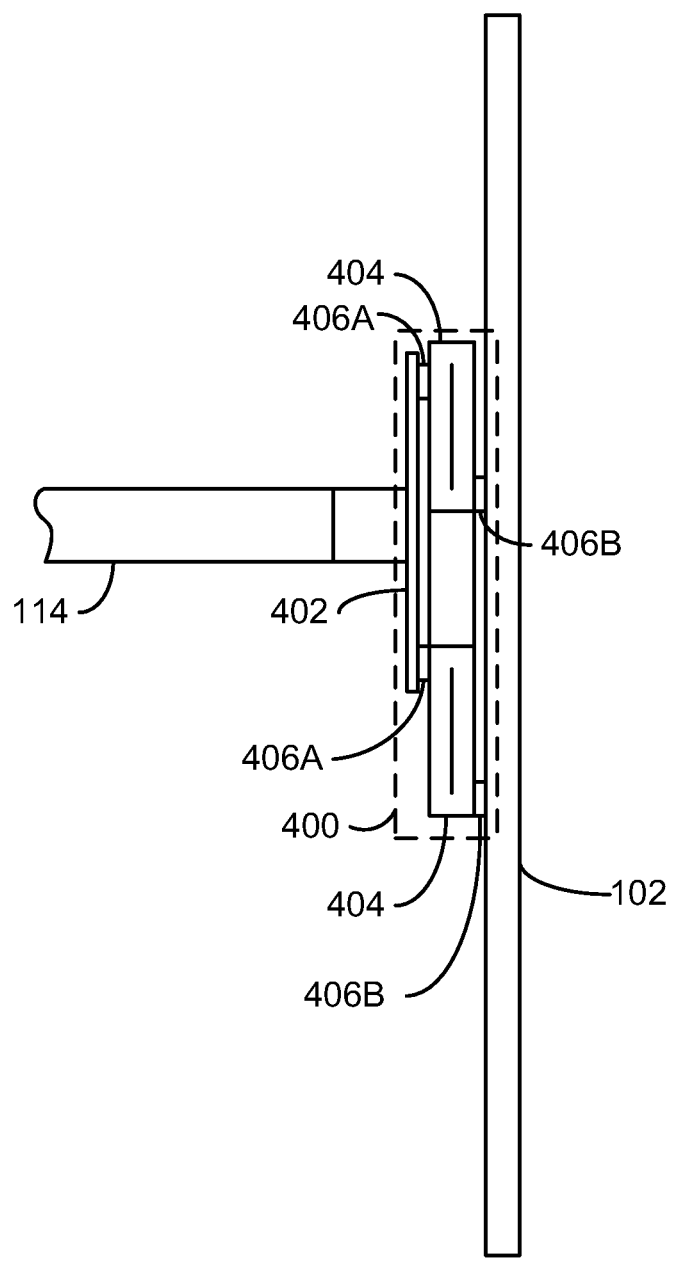
FIG. 4 is a schematic showing a side view of a mounting for the touch screen of the 3D haptic touch screen device of FIG. 1.

FIG. 4 is a schematic showing a side view of a mounting 400 for the touch screen 102 of the 3D haptic touch screen device 100 of FIG. 1. Like numbered items are as described with respect to FIG. 1. The mounting 400 may be used to attach the touch screen 102 to the dual linear bearing 114 of the single axis robot 104. The mounting 400 may include a mounting plate 402 and a number of force transducers 404. In various embodiments, the mounting 400 includes four force transducers 404, as discussed further with respect to FIG. 5. However, it is to be understood that any suitable number of force transducers 404 may be used for the mounting 400. The force transducers 404 may be physically attached to the mounting plate 402 via a number of spacers 406A, and may also be physically attached to the touch screen 102 via a number of spacers 406B.

Figure 5:
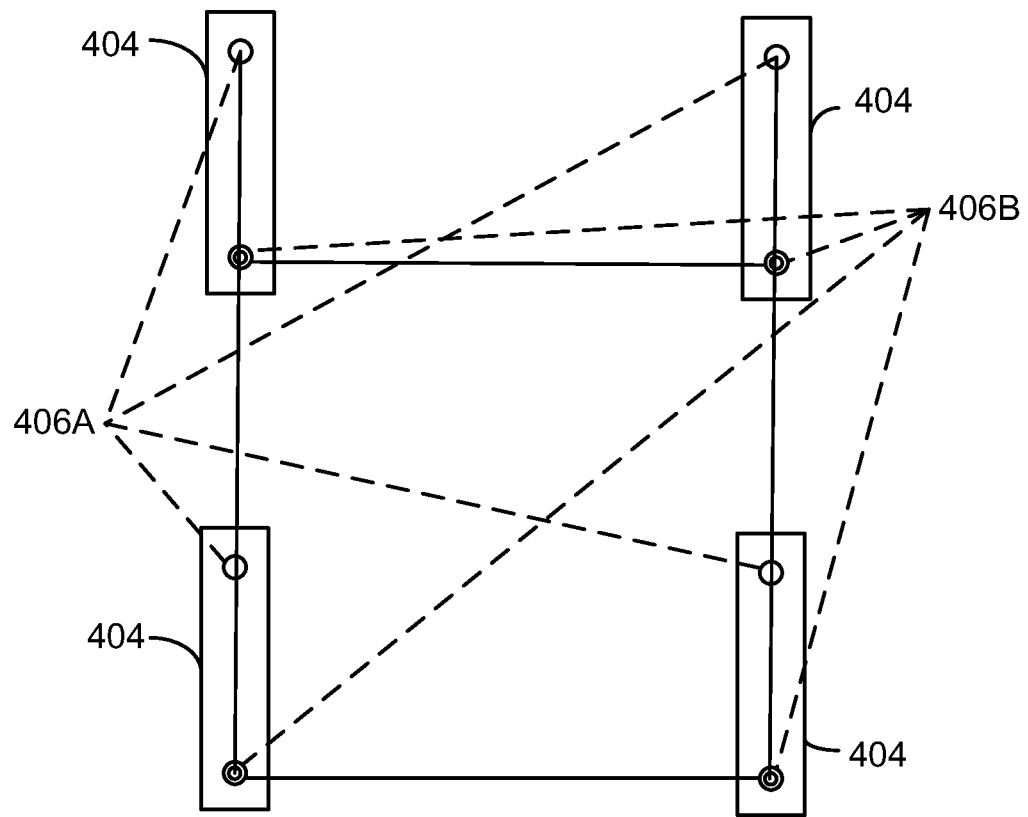
FIG. 5 is a schematic showing a load cell arrangement for the force transducers that are mounted between the touch screen and the mounting plate.

FIG. 5 is a schematic showing a load cell arrangement 500 for the force transducers 404 that are mounted between the touch screen 102 and the mounting plate 402. Like numbered items are as described with respect to FIG. 4. As shown in FIG. 5, the load cell arrangement 500 may include four equally spaced force transducers 404 mounted on the four corners of the mounting plate 402. The force transducers 404 may be used to monitor a touch force applied to the touch screen 102.

In various embodiments, the force transducers 404 output their applied touch force values to the microcontroller 312. The microcontroller 312, in turn, processes this data through a PID servo control loop and cause the controller 308 of the servomotor 118 to move the touch screen 102 in the z-direction. According to one exemplary operation scenario, the loop is closed by commanding the touch screen 102 to exert a constant force F(z) against the user's finger 110 whenever the z-axis sliding mechanism is between the two z-limit switches and there is an active x-y touch signal. From the user's perspective, the touch screen 102 may appear to behave as if it is mounted on a constant-force z-axis spring. When the user touches the touch screen 102 with a force=F (z), the touch screen 102 will move away from the user, keeping the constant F(Z) force against the touching finger 110 as it moves in the z-direction. If the user's finger 110 moves in a z-direction away from the touch screen 102, the touch screen 102 will retract with the finger 110, again keeping a constant force F(z) against the finger 110. If the user attempts to move the touch screen 102 beyond any of the positive or negative z-limit switches, the touch screen 102 will cease to move in that direction.

According to another exemplary operation scenario, more complicated haptic functions can be implemented with the F(z) forcing function. Instead of a constant touch force for all Z, the system could command a force=F(z)=K*x or according to Hooke's Law relationship. From the user's perspective, the touch screen 102 may appear to behave as if a spring is attempting to restore the touch screen 102 against the user's touch with a force proportional to the z-distance traveled.

Another haptic function that may be implemented includes a programmable detent, i.e., a sudden increase in absolute restoring force at a certain z-location. In some cases, the touch screen 102 may physically stop at the certain z-location until a touch force that is above a predetermined upper threshold or below a predetermined lower threshold is detected, at which point the touch screen 102 may move away from the detent.

Other haptic functions may also be implemented while the touch screen 102 is being moved by the user. The force F(z) may be modulated as a function of velocity, imparting a viscous sensation or a textured feel as a function of z-position. In addition, a z-axis palpation function may be generated to allow a user to feel a 3D surface of an object that is being displayed on the touch screen 102. For example, the force F(z) may be proportional to the surface of the object at the specific location at which the user's finger 110 contacts the touch screen 102.

Figure 6A:
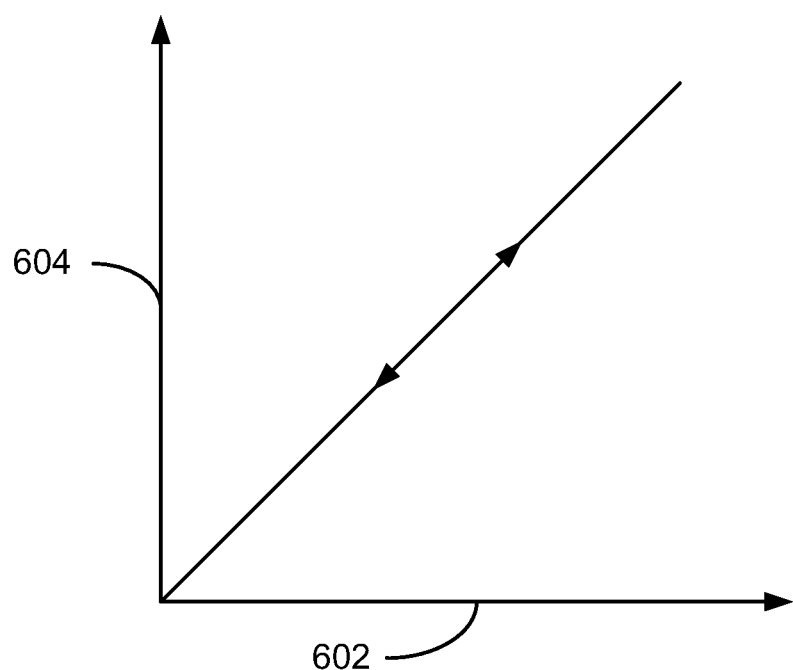
FIG. 6A is a graph showing z-axis displacement as a function of applied touch force for a haptic touch screen including simple spring compliance characteristics.

FIG. 6A is a graph 600 showing z-axis displacement as a function of applied touch force for a haptic touch screen including simple spring compliance characteristics. An x-axis 602 of the graph 600 represents an applied touch force, and a y-axis 604 of the graph 600 represents a z-axis displacement of the touch screen. According to the embodiment shown in FIG. 6A, the touch screen responds to the applied touch force as if it is mounted on a spring with a simple linear force-position relationship. Specifically, increasing the applied touch force causes the touch screen to move away from the user, i.e., in the positive z-direction, and decreasing the applied touch force causes the touch screen to retract towards the user, i.e., in the negative z-direction.

Figure 6B:
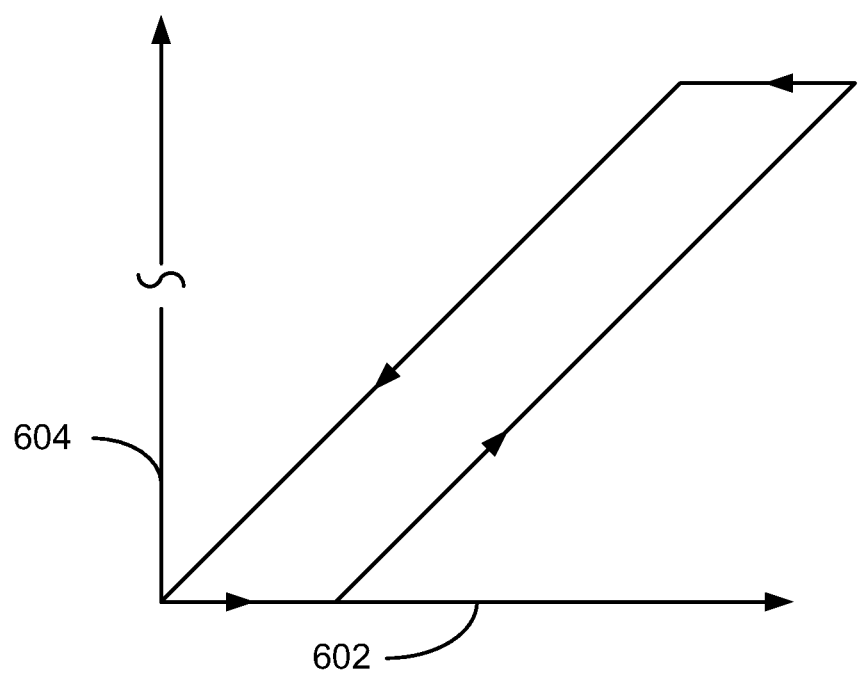
FIG. 6B is a graph showing z-axis displacement as a function of applied touch force for a haptic touch screen including spring compliance with hysteresis characteristics.

FIG. 6B is a graph 606 showing z-axis displacement as a function of applied touch force for a haptic touch screen including spring compliance with hysteresis characteristics. Like numbered items are as described with respect to FIG. 6A. According to the embodiment shown in FIG. 6B, both the z-position of and x-y coordinate of the applied touch force are taken into consideration. The combination of the z-position of and x-y coordinate of the applied touch force may represent the position of the touch in 3D-space. This information may be used to render a stereographic 3D image at that particular z-position. Superimposed on the z-axis forcing function could be additional forcing behavior representing, for example, a non-linear force function for which hysteresis causes a deadband in the force-movement behavior. This would allow the user to more easily stop and hold a particular Z-position.

Figure 6C:
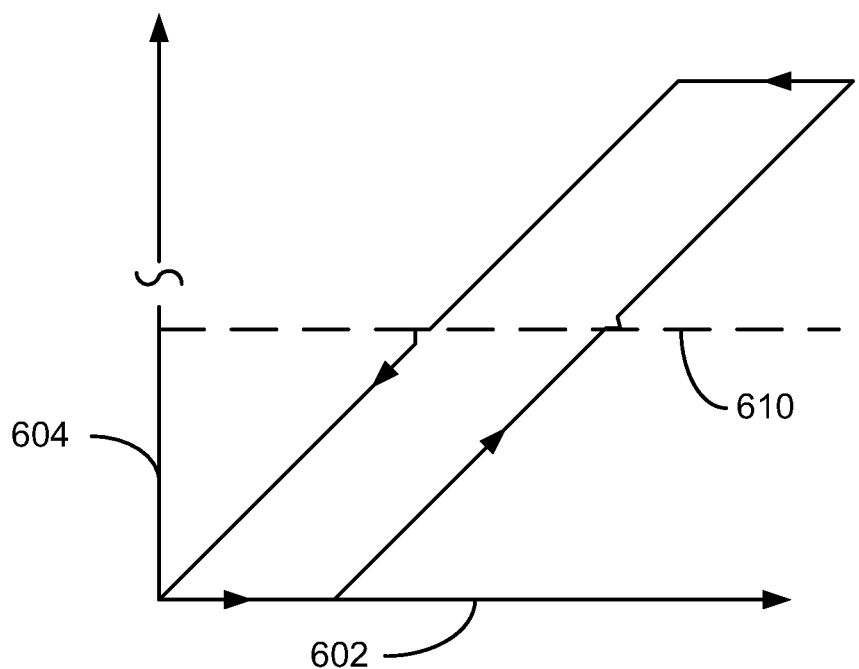
FIG. 6C is a graph showing z-axis displacement as a function of applied touch force for a haptic touch screen including programmable detent characteristics.

FIG. 6C is a graph 608 showing z-axis displacement as a function of applied touch force for a haptic touch screen including programmable detent characteristics. Like numbered items are as described with respect to FIG. 6A. According to the embodiment shown in FIG. 6C, detents may be imposed at certain z-positions. Such detents may cause the touch screen to physically stop at certain z-positions, as indicated by dotted line 610. The touch screen may then remain at that z-position until a touch force that is above a predetermined upper threshold or below a predetermined lower threshold is detected, at which point the touch screen may move away from the detent.

Further, in various embodiments, the haptic touch screen may be able to implement the simulated palpation of a visually rendered object. For example, if a sphere is visually rendered on the touch screen, the user may observe the sphere in stereoscopic 3D as well as "feel" the sphere's surface in the z-direction, depending on where the user touches the sphere in 3D-space. Additional textures and haptic sensations may also be used to impart a z-axis haptic perception driven by the 3D-space position. Different forces that depend on the x-y coordinate of the applied touch force may also be imparted to the touch screen movement. For example, the touch screen may allow a user to trace a path through a 3D street database with his finger. As another example, the touch screen may allow a user to trace a vessel in a medical 3D database with his finger. The user may begin at one z-plane, pick a particular vessel to trace, and then proceed in the z-direction, as well as the x-direction and the y-direction, by moving his finger through the selected vessel.

Figure 7:
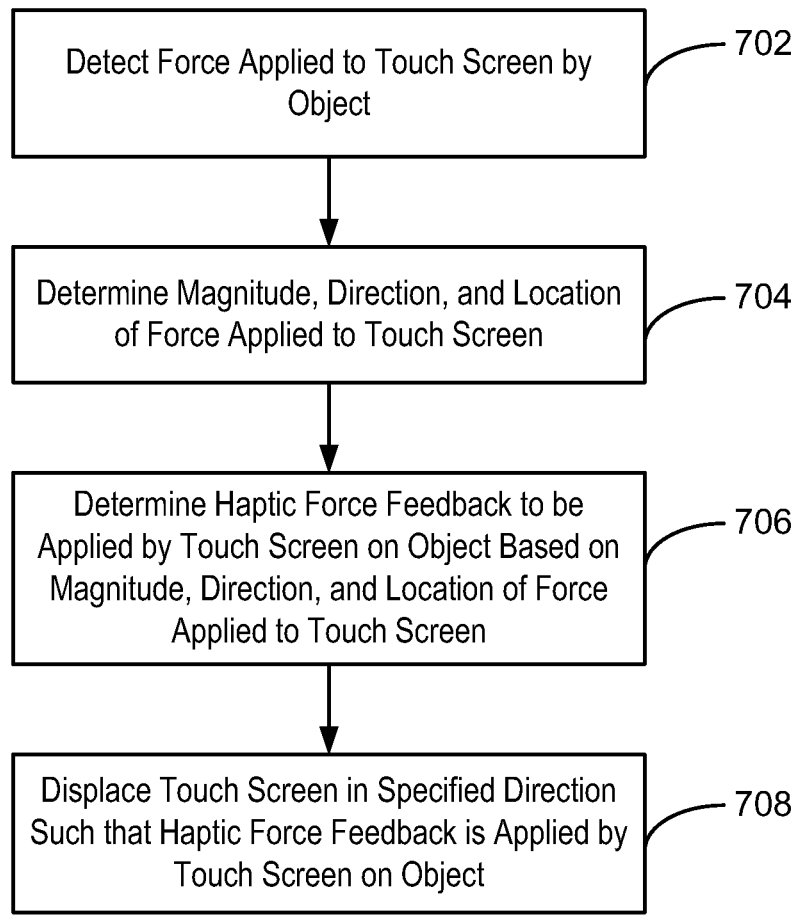
FIG. 7 is a process flow diagram of a method for providing multi-dimensional haptic touch screen interaction.

FIG. 7 is a process flow diagram of a method 700 for providing multi-dimensional haptic touch screen interaction. In various embodiments, the method 700 may be implemented by any suitable computing system or device including a haptic touch screen. The method 700 begins at block 702 with the detection of a force that is applied to a touch screen by an object. In various embodiments, the object is a finger of a user. However, the object could also be any other suitable type of object or device that the user may use to interact with the touch screen, such as a stylus or pen, for example. Furthermore, the object may include more than one object. For example, the object may include multiple fingers or a pen in combination with a finger.

At block 704, the magnitude, direction, and location of the force applied to the touch screen is determined. In various embodiments, a linear force sensor within the computing system detects the force applied to the touch screen and sends a signal corresponding to the detected force to a processor of the computing system. The processor then determines the magnitude, direction, and location of the force applied to the touch screen. The location of the force may be the x-y coordinate on the touch screen at which the force is applied.

At block 706, a haptic force feedback to be applied by the touch screen on the object is determined based on the magnitude, direction, and location of the force applied to the touch screen. The haptic force feedback may provide a 3D haptic interaction for the user. For example, from the user's perspective, the haptic force feedback may be manifested as viscous feel, a detent at specified positions, or a texture as a function of position in 3D space.

At block 708, the touch screen is displaced in a specified direction such that the haptic force feedback is applied by the touch screen on the object. The distance that the touch screen is displaced may depend on the magnitude of the force applied to the touch screen. In various embodiments, the touch screen is displaced in the z-direction. Specifically, the touch screen may move in the positive z-direction away from the user if the magnitude of the force applied to the touch screen exceeds a specified upper threshold, or may move in the negative z-direction toward the user if the magnitude of the force applied to the touch screen is below a specified lower threshold. In addition, the location, e.g., x-y coordinate, of the force applied to the touch screen and the z-coordinate of the position of the touch screen may be used to render a stereographic three-dimensional image on the touch screen.

Further, in some embodiments, the touch screen moves in a plane that is tangential to the direction of the force applied to the touch screen. For example, the touch screen may tilt based on the direction of the force applied to the touch screen, and may then move in that direction. In addition, a stereographic three-dimensional image may be rendered based on a position of the touch screen in three-dimensional space, which may be determined based on the location of the force applied to the touch screen and the position and direction of movement of the touch screen.

In various embodiments, a detent is imposed at a specified position during displacement of the touch screen in the specified direction. The detent may be imposed until the force applied to the touch screen exceeds a predetermined upper threshold or drops below a predetermined lower threshold. In some embodiments, a specific annotation or trigger within the image or video displayed on the touch screen may cause the detent to be imposed. The detent may alert the user of the existence of the annotation or trigger at the specified position. Moreover, in some embodiments, the touch screen may vibrate at the specified position during displacement of the touch screen. For example, the touch screen may vibrate by rapidly moving back and forth for a short period of time. Such vibration may alert the user of the existence of the annotation or trigger at the specified position. In some embodiments, the vibration is used in combination with the detent. In other embodiments, the vibration is used as an alternative to the detent. Further, in various embodiments, a deadband is imposed during displacement of the touch screen. Such a deadband may be caused by hysteresis.

In some embodiments, a three-dimensional image (or video) being displayed by the touch screen is tightly linked to the movement of the touch screen and the position of the force applied to the touch screen. For example, if the touch screen is displaying an image of a balloon, the balloon may appear to deform as the touch screen moves toward the user. This may allow the user to effectively "feel" the compliance of the balloon as if the balloon is pushing against his finger. If the user reduces the force applied to the balloon, the balloon may appear to return to its original shape as the touch screen moves away from the user. As another example, in the case of medical imaging applications, the user may virtually travel through the veins of the body by pushing on the touch screen with his finger, and may effectively "feel" the texture of the veins as haptic force feedback applied by the touch screen on the finger of the user. For example, a blood clot in a vein may cause a detent to be imposed at the location of the blood clot, causing the touch screen to suddenly stop moving and, thus, alerting the user that there is an abnormality in that region of the vein.

In other embodiments, the three-dimensional image being displayed by the touch screen is not tightly linked to the movement of the touch screen. For example, if the touch screen is displaying an image of a map, the user may move his finger across the map, causing the touch screen to move toward or away from the user to indicate the presence of mountains or valleys within the map, for example. Moreover, a detent may be imposed at a specific location within the map, causing the touch screen to suddenly stop moving and, thus, alerting the user that there is something in that location that may be worth exploring. However, the actual image of the map being displayed by the touch screen may change very little (if at all) as the user moves his finger across the map. As another example, if the touch screen is displaying an image of a rigid cylinder, the touch screen may move toward or away from the user as the user moves his finger across the touch screen to indicate the z-contour or shape of the cylinder. However, the actual image of the cylinder being displayed by the touch screen may not change.

Further, in some embodiments, the touch screen displays a two-dimensional image (or video). For example, the touch screen may display a collection of two-dimensional images representing slices of the brain. Specific brain slices within the collection may be annotated, and the touch screen may impose a detent or other type of haptic feedback for annotated brain slices as a medical expert navigates through the collection.

The process flow diagram of FIG. 7 is not intended to indicate that the blocks of the method 700 are to be executed in any particular order, or that all of the blocks are to be included in every case. Further, any number of additional blocks not shown in FIG. 7 may be included within the method 700, depending on the details of the specific implementation.

The method 700 may provide multi-dimensional haptic interaction for a variety of applications, such as medical imaging applications, gaming applications, computer-aided design (CAD) applications, telepresence applications, present applications, or the like. For example, in the case of a telepresence application, the method 700 may allow multiple collaborators who are working together from remote locations to interact with one another using haptic force feedback applied by the touch screen being used by each collaborator. As another example, in the case of a presentation application (e.g, MICROSOFT POWERPOINT, available from Microsoft Corporation of Redmond, Wash.), the method 700 may allow a user to push on the touch screen to move through layers of objects. Specifically, the user may push on the touch screen to move deeper into the layers of objects and grab a particular object, and release the touch screen or push further to place the particular object in a different layer.

In some embodiments, the touch screen includes a number of display tiles, and each display tile is configured to independently move in any suitable plane such that the haptic force feedback is applied by the touch screen on the object. For example, if the user touches the touch screen using a number of different fingers, each tile that is touched may respond differently. As another example, one tile on the touch screen may act as a control panel that may be actuated with one finger, while the other tiles may be configured to move in response to being touched by the user's other fingers. Further, in some embodiments, if force is applied to the touch screen in a second position, the touch screen may lock or stop moving so that the user may annotate the touch screen without causing the touch screen to move.

In various embodiments, the touch screen is used as a display device to display an image, such as a stereographic three-dimensional image, to the user. However, in other embodiments, the touch screen is remote from (but communicably coupled to) the display device. In such embodiments, the user may apply force to the touch screen and may feel the haptic force feedback from the touch screen, but may view the actual image corresponding to the haptic force feedback on the separate display device.

Figure 8:
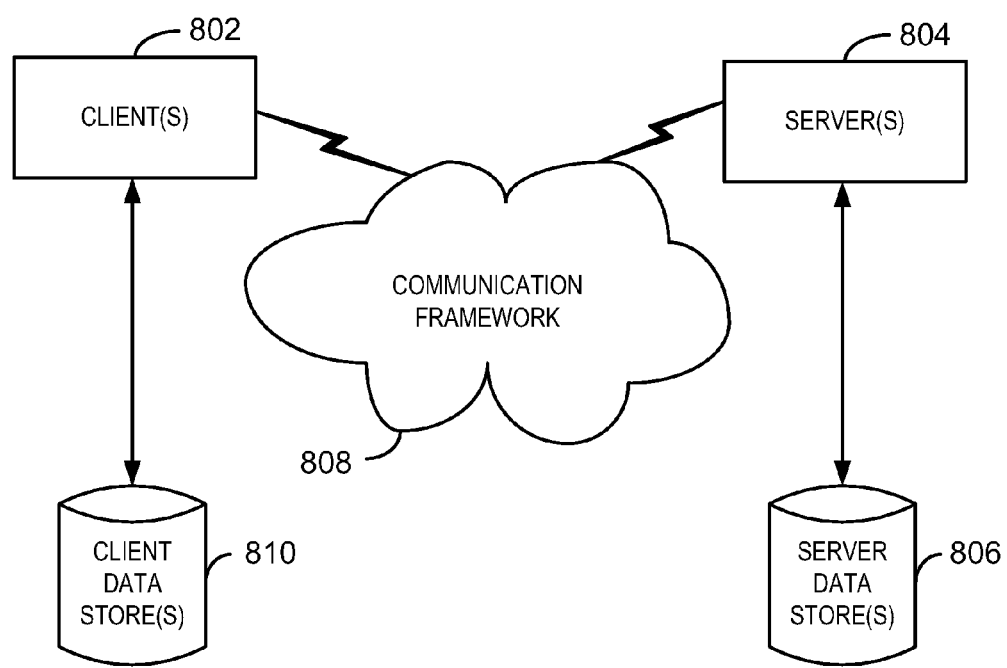
FIG. 8 is a block diagram of a networking environment in which a system and method for providing multi-dimensional haptic touch screen interaction may be implemented.
Figure 9:
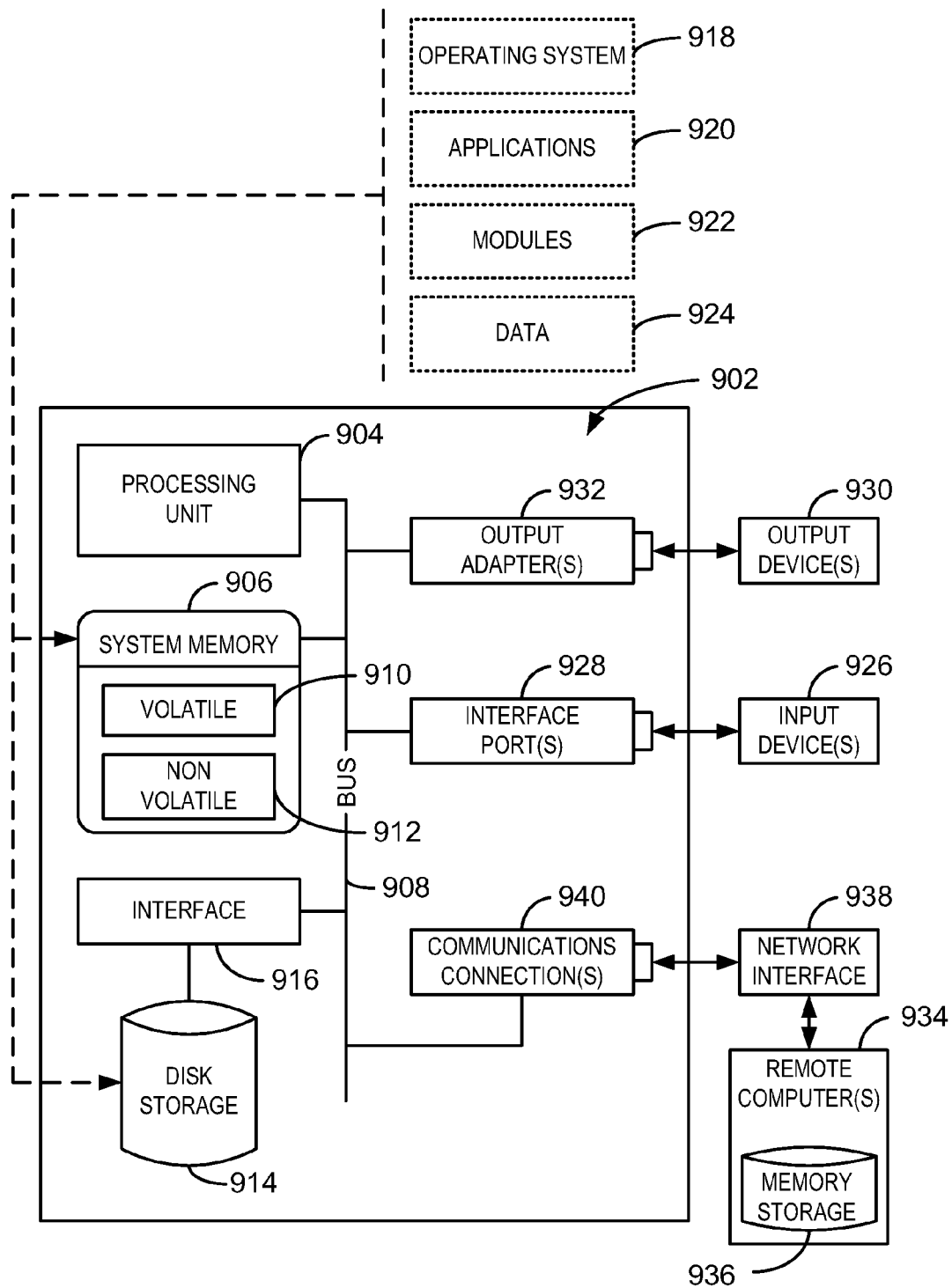
FIG. 9 is a block diagram of a computing environment that may be used to implement a system and method for providing multi-dimensional haptic touch screen interaction.

In order to provide context for implementing various aspects of the claimed subject matter, FIGS. 8-9 and the following discussion are intended to provide a brief, general description of a computing environment in which the various aspects of the subject innovation may be implemented. For example, a method and system for providing multi-dimensional haptic touch screen interaction can be implemented in such a computing environment. While the claimed subject matter has been described above in the general context of computer-executable instructions of a computer program that runs on a local computer or remote computer, those of skill in the art will recognize that the subject innovation also may be implemented in combination with other program modules. Generally, program modules include routines, programs, components, data structures, or the like that perform particular tasks or implement particular abstract data types.

Moreover, those of skill in the art will appreciate that the subject innovation may be practiced with other computer system configurations. For example, the subject innovation may be practiced with single-processor or multi-processor computer systems, minicomputers, mainframe computers, personal computers, hand-held computing devices, microprocessor-based or programmable consumer electronics, or the like, each of which may operatively communicate with one or more associated devices. The illustrated aspects of the claimed subject matter may also be practiced in distributed computing environments wherein certain tasks are performed by remote processing devices that are linked through a communications network. However, some, if not all, aspects of the subject innovation may be practiced on stand-alone computers. In a distributed computing environment, program modules may be located in local or remote memory storage devices.

FIG. 8 is a block diagram of a networking environment 800 in which a system and method for providing multi-dimensional haptic touch screen interaction may be implemented. The networking environment 800 includes one or more client(s) 802. The client(s) 802 can be hardware and/or software (e.g., threads, processes, or computing devices). The networking environment 800 also includes one or more server(s) 804. The server(s) 804 can be hardware and/or software (e.g., threads, processes, or computing devices). The server(s) 804 can house threads to perform search operations by employing the subject innovation, for example.

One possible communication between a client 802 and a server 804 can be in the form of a data packet adapted to be transmitted between two or more computer processes. The networking environment 800 includes a communication framework 808 that can be employed to facilitate communications between the client(s) 802 and the server(s) 804. The client(s) 802 are operably connected to one or more client data store(s) 810 that can be employed to store information local to the client(s) 802. The client data store(s) 810 may be stored in the client(s) 802, or may be located remotely, such as in a cloud server. Similarly, the server(s) 804 are operably connected to one or more server data store(s) 806 that can be employed to store information local to the servers 804.

FIG. 9 is a block diagram of a computing environment 900 that may be used to implement a system and method for providing multi-dimensional haptic touch screen interaction. The computing environment 900 includes a computer 902. The computer 902 includes a processing unit 904, a system memory 906, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structures, including the memory bus or memory controller, a peripheral bus or external bus, or a local bus using any variety of available bus architectures known to those of ordinary skill in the art. The system memory 906 is computer-readable storage media that includes volatile memory 910 and non-volatile memory 912. The basic input/output system (BIOS), containing the basic routines to transfer information between elements within the computer 902, such as during start-up, is stored in non-volatile memory 912. By way of illustration, and not limitation, non-volatile memory 912 can include read-only memory (ROM), programmable ROM (PROM), electrically-programmable ROM (EPROM), electrically-erasable programmable ROM (EEPROM), or flash memory.

Volatile memory 910 includes random access memory (RAM), which acts as external cache memory. By way of illustration and not limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 902 also includes other computer-readable storage media, such as removable/non-removable, volatile/non-volatile computer-readable storage media. FIG. 9 shows, for example, a disk storage 914. Disk storage 914 may include, but is not limited to, a magnetic disk drive, floppy disk drive, tape drive, Jaz drive, Zip drive, LS-100 drive, flash memory card, or memory stick.

In addition, disk storage 914 can include storage media separately or in combination with other storage media including, but not limited to, an optical disk drive such as a compact disk ROM device (CD-ROM), CD recordable drive (CD-R Drive), CD rewritable drive (CD-RW Drive), or a digital versatile disk ROM drive (DVD-ROM). To facilitate connection of the disk storage 914 to the system bus 908, a removable or non-removable interface is typically used, such as interface 916.

It is to be appreciated that FIG. 9 describes software that acts as an intermediary between users and the basic computer resources described in the computing environment 900. Such software includes an operating system 918. The operating system 918, which can be stored on disk storage 914, acts to control and allocate resources of the computer 902.

System applications 920 take advantage of the management of resources by the operating system 918 through program modules 922 and program data 924 stored either in system memory 906 or on disk storage 914. It is to be appreciated that the claimed subject matter can be implemented with various operating systems or combinations of operating systems.

A user enters commands or information into the computer 902 through input devices 926. According to embodiments described herein, input devices 926 can include a multi-dimensional haptic touch screen device, such as the 3D haptic touch screen device 100 described above with respect to FIGS. 1-5. Input devices 926 can also include, but are not limited to, a pointing device (such as a mouse, trackball, stylus, or the like), a keyboard, a microphone, a gesture or touch input device, a voice input device, a joystick, a satellite dish, a scanner, a TV tuner card, a digital camera, a digital video camera, a web camera, or the like. The input devices 926 connect to the processing unit 904 through the system bus 908 via interface port(s) 928. Interface port(s) 928 can include, for example, a serial port, a parallel port, a game port, and a universal serial bus (USB). Output device(s) 930 may also use the same types of ports as input device(s) 926. Thus, for example, a USB port may be used to provide input to the computer 902 and to output information from the computer 902 to an output device 930.

An output adapter 932 is provided to illustrate that there are some output devices 930 like monitors, speakers, and printers, among other output devices 930, which are accessible via the output adapters 932. The output adapters 932 include, by way of illustration and not limitation, video and sound cards that provide a means of connection between the output device 930 and the system bus 908. It can be noted that other devices and/or systems of devices provide both input and output capabilities, such as remote computer(s) 934.

The computer 902 can be a server in a networking environment, such as the networking environment 800, that communicates with one or more remote computers, such as remote computer(s) 934. The remote computer(s) 934 may be client systems configured with web browsers, PC applications, mobile phone applications, and the like. The remote computer(s) 934 can be a personal computer, a server, a router, a network PC, a workstation, a microprocessor based appliance, a mobile phone, a peer device or other common network node and the like, and typically includes many or all of the elements described relative to the computer 902. For purposes of brevity, the remote computer(s) 934 are illustrated with a memory storage device 936. The remote computer(s) 934 are logically connected to the computer 902 through a network interface 938, and physically connected to the computer 902 via a communication connection 940.

Network interface 938 encompasses wired and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 940 refers to the hardware and/or software employed to connect the network interface 938 to the system bus 908. While communication connection 940 is shown for illustrative clarity inside the computer 902, it can also be external to the computer 902. The hardware and/or software for connection to the network interface 938 may include, for example, internal and external technologies such as mobile phone switches, modems including regular telephone grade modems, cable modems and DSL modems, ISDN adapters, and Ethernet cards.

It is to be understood that the block diagrams of FIGS. 8 and 9 are not intended to indicate that the networking environment 800 and the computing environment 900 are to include all the components shown in FIGS. 8 and 9, respectively. Further, the networking environment 800 and/or the computing environment 900 may include any number of additional components not shown in FIGS. 8 and/or 9, respectively, depending on the details of the specific implementation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing multi-dimensional haptic touch screen interaction, comprising:
   detecting a force applied to a touch screen by a first object, wherein the touch screen comprises a first and second display tile contacting the first object, wherein the first and second display tile of the touch screen move in a plurality of planes to apply a force on the first object and a second object, respectively;
   determining a magnitude, a direction, and a location of the force applied to the first and second display tile of the touch screen; and
   determining a haptic force feedback to be applied by the first display tile of the touch screen on the first object based on the magnitude, the direction, and the location of the force applied to the first and second display tile of the touch screen; where the touch screen locks for a user annotation in response to a detected force on the touch screen in a second position.

2. The method of claim 1, comprising linking a three-dimensional image being displayed by the touch screen with a displacement of the touch screen in a z-direction.

3. The method of claim 1, comprising:
   determining a z-coordinate of a position of the touch screen during displacement of the touch screen in a z-direction; and
   rendering a stereographic three-dimensional image on the touch screen based on the location of the force applied to the touch screen and the z-coordinate of the position of the touch screen.

4. The method of claim 1, comprising moving the touch screen in a positive z-direction if the magnitude of the force applied to the touch screen exceeds a specified upper threshold.

5. The method of claim 1, comprising moving the touch screen in a negative z-direction if the magnitude of the force applied to the touch screen is below a specified lower threshold.

6. The method of claim 1, wherein applying the haptic force feedback comprises imposing a detent or a vibration, or both, at a specified position during displacement of the touch screen, and wherein the detent or the vibration, or both, are imposed until the force applied to the touch screen exceeds a predetermined upper threshold or drops below a predetermined lower threshold.

7. The method of claim 1, wherein applying the haptic force feedback comprises imposing a deadband during displacement of the touch screen, wherein the deadband is determined based on hysteresis.

8. The method of claim 1, comprising:
   displacing the touch screen in a positive z-direction if the force applied is increased; and
   displacing the touch screen in a negative z-direction if the force applied is decreased.

9. The method of claim 1, wherein the haptic feedback is z-axis displacement comprising programmable detent characteristics.

10. A computing system for providing multi-dimensional haptic touch screen interaction, comprising:
    a haptic touch screen device comprising a touch screen and a force sensor, wherein the force sensor is configured to detect a force applied to the touch screen by a first object, and wherein the touch screen comprises a first and second display tile contacting the first object and a second object, respectively, wherein the first and second display tile of the touch screen move in a plurality of planes to apply a force on the first and second object, respectively;
    a processor that is adapted to execute stored instructions; and
    a system memory, wherein the system memory comprises code configured to: determine a magnitude, a direction, and a location of the force applied to the first and second display tile of the touch screen; and
    determine a haptic force feedback to be applied by the first display tile of the touch screen on the first object based on the magnitude, the direction, and the location of the force applied to the first and second display tile of the touch screen, where the touch screen locks for a user annotation in response to a detected force on the touch screen in a second position.

11. The system of claim 10, wherein the haptic touch screen device is configured to move the touch screen in a positive z-direction if the magnitude of the force applied to the touch screen exceeds a specified upper threshold, and wherein the haptic touch screen device is configured to move the touch screen in a negative z-direction if the magnitude of the force applied to the touch screen is below a specified lower threshold.

12. The system of claim 10, wherein the haptic touch screen device is configured to link a three-dimensional image being displayed by the touch screen with the movement of the touch screen.

13. The system of claim 10, wherein the haptic force feedback comprises a detent or a vibration, or both, imposed at a specified position during movement of the touch screen, and wherein the detent or the vibration, or both, are imposed until the force applied to the touch screen exceeds a predetermined upper threshold or drops below a predetermined lower threshold.

14. The system of claim 10, wherein the haptic force feedback comprises a deadband imposed during displacement of the touch screen, and wherein the deadband is determined based on hysteresis.

15. The system of claim 10, wherein the touch screen is configured to render a stereographic three-dimensional image based on the location of the force applied to the touch screen and a position of the touch screen in three-dimensional space.

16. The system of claim 10, wherein the haptic touch screen device is configured to control movement of the touch screen in real-time based on variations in the force applied to the touch screen by the object.

17. The system of claim 10, wherein the touch screen comprises two-dimensional multi-touch input and stereographic three-dimensional output.

18. One or more computer-readable storage media for storing computer-readable instructions, the computer-readable instructions providing a system for providing multi-dimensional haptic touch screen interaction when executed by one or more processing devices, the computer-readable instructions comprising code configured to:

detect a force applied to a touch screen by a first finger of a user, wherein the touch screen comprises a first and second display tile contacting the first finger and a second finger of a user, respectively, wherein the first and second display tile of the touch screen move in a plurality of planes to apply a force on the first and the second finger, respectively;

determine a magnitude, a direction, and a location of the force applied to the first and second display tile of the touch screen;

determine a haptic force feedback to be applied by the first display tile of the touch screen on the first finger of the user based on the magnitude, the direction, and the location of the force applied to the first and second display tile of the touch screen, where the touch screen locks for a user annotation in response to a detected force on the touch screen in a second position.

* * * * *